(12) United States Patent
McAllister et al.

(10) Patent No.: US 8,605,104 B1
(45) Date of Patent: Dec. 10, 2013

(54) THRESHOLD-BASED LOSSY REDUCTION COLOR COMPRESSION

(75) Inventors: David Kirk McAllister, Holladay, UT (US); Steven E. Molnar, Chapel Hill, NC (US); Narayan Kulshrestha, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1016 days.

(21) Appl. No.: 12/651,357

(22) Filed: Dec. 31, 2009

(51) Int. Cl.
*G06T 15/30* (2011.01)
*G09G 5/00* (2006.01)
*G09G 5/02* (2006.01)
*G03F 3/08* (2006.01)
*H04N 1/46* (2006.01)
*G06K 9/00* (2006.01)
*G06K 9/46* (2006.01)
*G06K 9/36* (2006.01)

(52) U.S. Cl.
USPC ........... 345/589; 345/423; 345/606; 345/611; 345/555; 358/518; 358/525; 382/276; 382/164; 382/166; 382/235; 382/244

(58) Field of Classification Search
USPC ......... 345/418, 423, 428, 581–582, 589, 600, 345/606, 611, 612–614, 619, 501, 545–549, 345/552, 555; 358/518, 525, 539, 426.13, 358/426.14, 448, 453; 382/162, 164–166, 382/167, 168, 172, 218–221, 232, 235, 244, 382/254, 274, 276, 282, 300
See application file for complete search history.

(56) References Cited

U.S. PATENT DOCUMENTS

| | | | | |
|---|---|---|---|---|
| 5,032,903 A * | 7/1991 | Suzuki et al. | ................. | 358/530 |
| 6,683,979 B1 * | 1/2004 | Walker et al. | ................. | 382/166 |
| 6,825,847 B1 | 11/2004 | Molnar et al. | | |
| 7,075,681 B1 * | 7/2006 | Brothers | ................. | 358/426.01 |
| 7,479,965 B1 | 1/2009 | King et al. | | |
| 2004/0086177 A1 * | 5/2004 | Zhang et al. | ................. | 382/167 |
| 2005/0213128 A1 * | 9/2005 | Imai et al. | ..................... | 358/1.9 |
| 2008/0247641 A1 * | 10/2008 | Rasmusson et al. | .......... | 382/166 |
| 2010/0060629 A1 * | 3/2010 | Rasmusson et al. | .......... | 345/419 |

* cited by examiner

Primary Examiner — Wesner Sajous
(74) Attorney, Agent, or Firm — Patterson & Sheridan, LLP (57) ABSTRACT

One embodiment of the present invention sets forth a technique for compressing color data. Color data for a tile including multiple samples is compressed based on an equality comparison and a threshold comparison based on a programmable threshold value. The equality comparison is performed on a first portion of the color data that includes at least exponent and sign fields of floating point format values or high order bits of integer format values. The threshold comparison is performed on a second portion of the color data that includes mantissa fields of floating point format values or low order bits of integer format values. The equality comparison and threshold comparison are used to select either computed averages of the pixel components or the original color data as the output color data for the tile. When the threshold is set to zero, only tiles that can be compressed without loss are compressed.

21 Claims, 7 Drawing Sheets

THRESHOLD-BASED LOSSY REDUCTION COLOR COMPRESSION

BACKGROUND OF THE INVENTION

1. Field of the Invention

The present invention generally relates to graphics processing and more specifically to compression of color data.

2. Description of the Related Art

Conventional graphics processors use compression to reduce the bandwidth needed to access the color data stored in the frame buffer. Some forms of compression operate on tiles that include color data for several pixels. When the color data for multiple sub-pixel samples within a pixel or multiple pixels within a tile are compressed, visual artifacts may be introduced. For example, assume a tile includes a blue background and a red primitive that partially covers the tile. The color data for the tile is compressed by combining the color data to produce a purple color for the pixels along the edge where the red primitive overlaps the blue background and the compressed color data is written to memory. Visual artifacts are introduced when a second red primitive is received that covers the remaining portion of the tile. The compressed color data is read from memory and combined with the second red primitive to produce compressed color data that is reddish-purple along the edge. The final compressed color along the edge should be red, but instead the final compressed color along the edge is reddish-purple. None of the purple background color should be included in the final compressed color. The visual artifacts may appear as cracks at primitive edges in meshes.

Accordingly, what is needed in the art is a system and method for compressing color data without introducing visual artifacts.

SUMMARY OF THE INVENTION

A system and method for compressing color data for a tile including multiple samples uses an equality comparison and a threshold comparison to produce the compressed color data for the tile. The equality comparison is performed on a first portion of the color data that includes at least exponent and sign fields of floating point format values or high order bits of integer format values. The threshold comparison is performed on a second portion of the color data that includes mantissa fields of floating point format values or low order bits of integer format values. The equality comparison and threshold comparison are used to compress the color data or output the original color data as the output color data for the tile. A threshold value used for the threshold comparison may be set to zero to enable lossless compression of the color data.

Various embodiments of a method of the invention for compressing color data include receiving color data for a tile including multiple samples and comparing a first portion of the color data for each one of the multiple samples to determine an equality comparison result. A second portion of the color data for each one of the multiple samples is compared using a threshold value to compute per-channel differences for each one of the multiple samples and determine a threshold comparison result. The color data for the tile is compressed based on the equality comparison result and the threshold comparison result to produce output color data for the tile.

Various embodiments of the invention include a system for compressing color data. The system includes a processor that is configured to receive the color data for a tile including multiple samples and compare a first portion of the color data for each one of the multiple samples to determine an equality comparison result. A second portion of the color data for each one of the multiple samples is compared using a threshold value to compute per-channel differences for each one of the multiple samples and determine a threshold comparison result. The color data for the tile is compressed based on the equality comparison result and the threshold comparison result to produce output color data for the tile.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
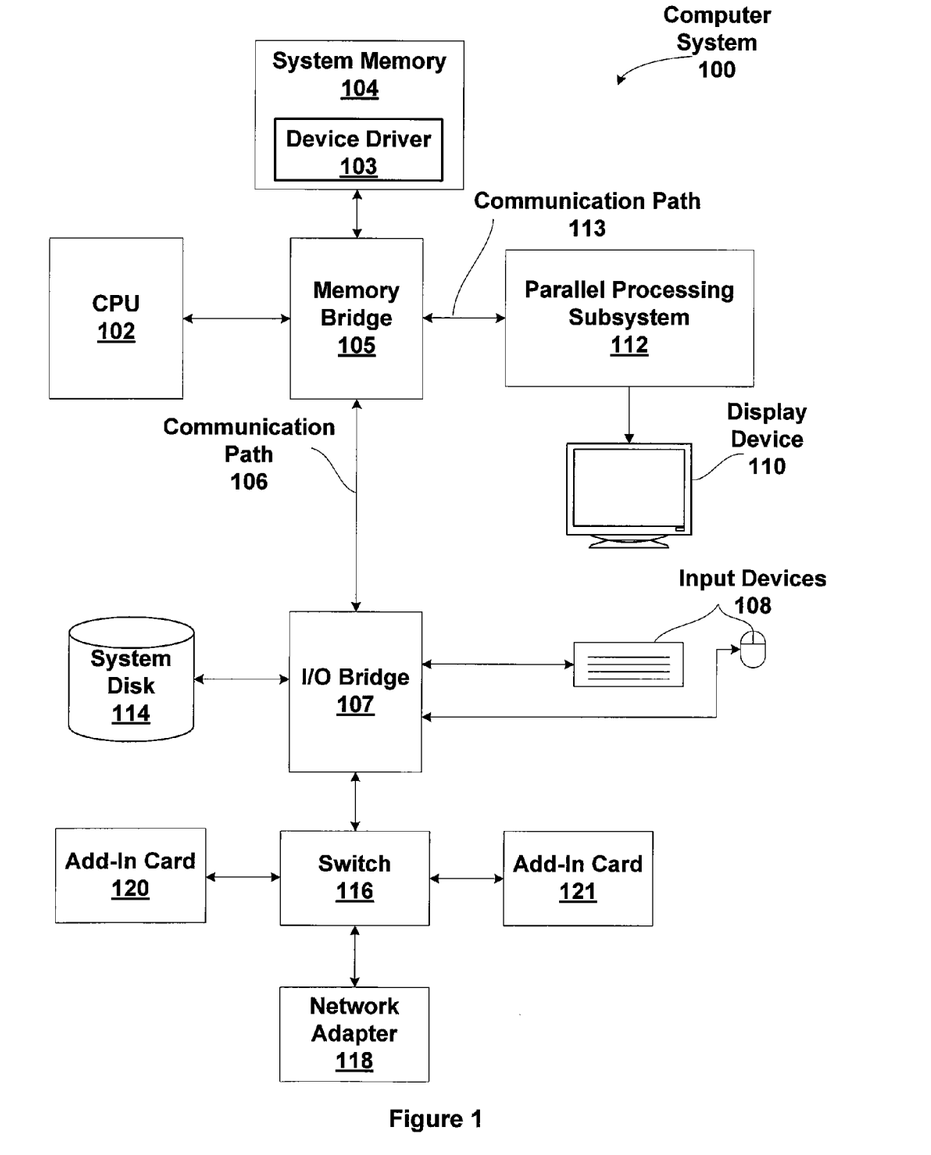
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
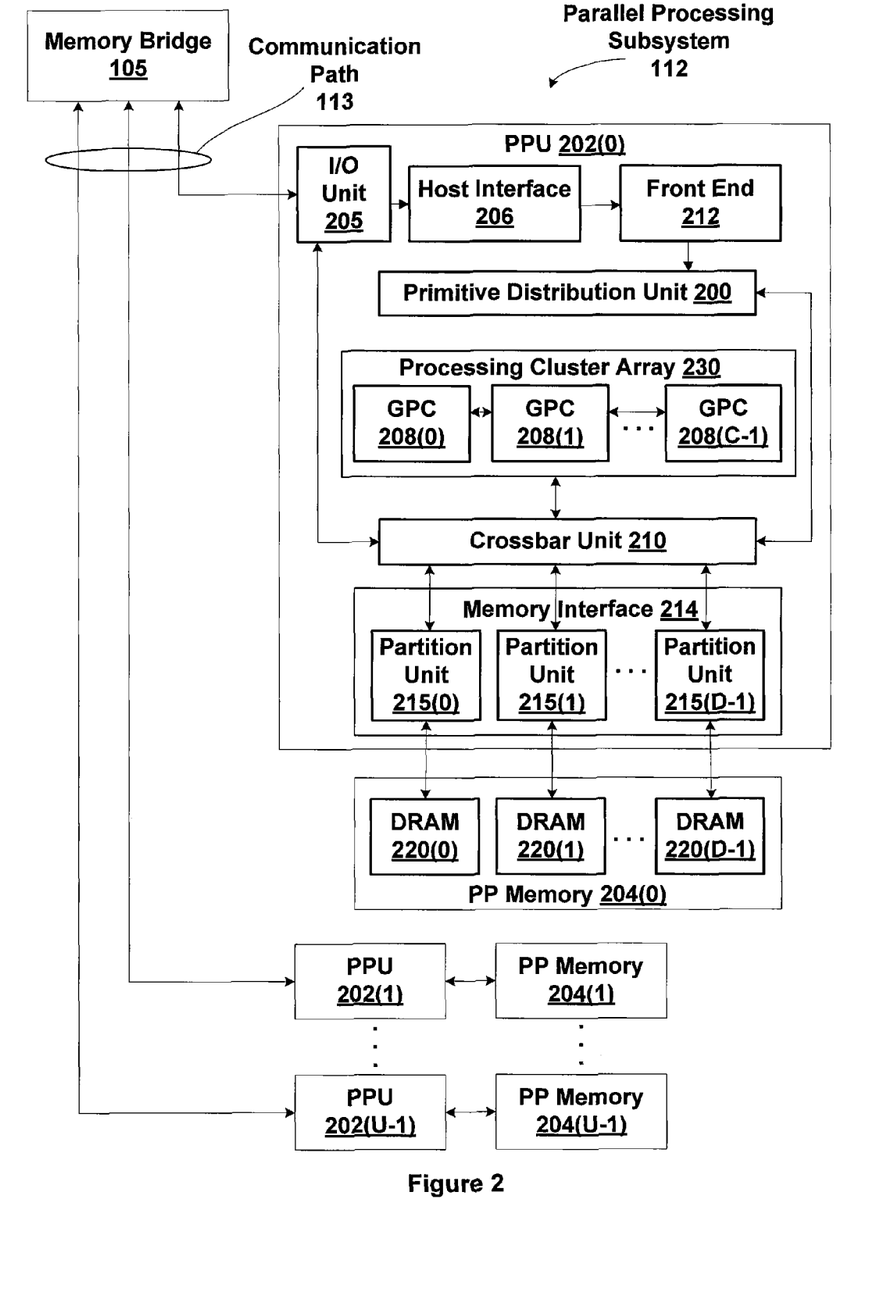
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
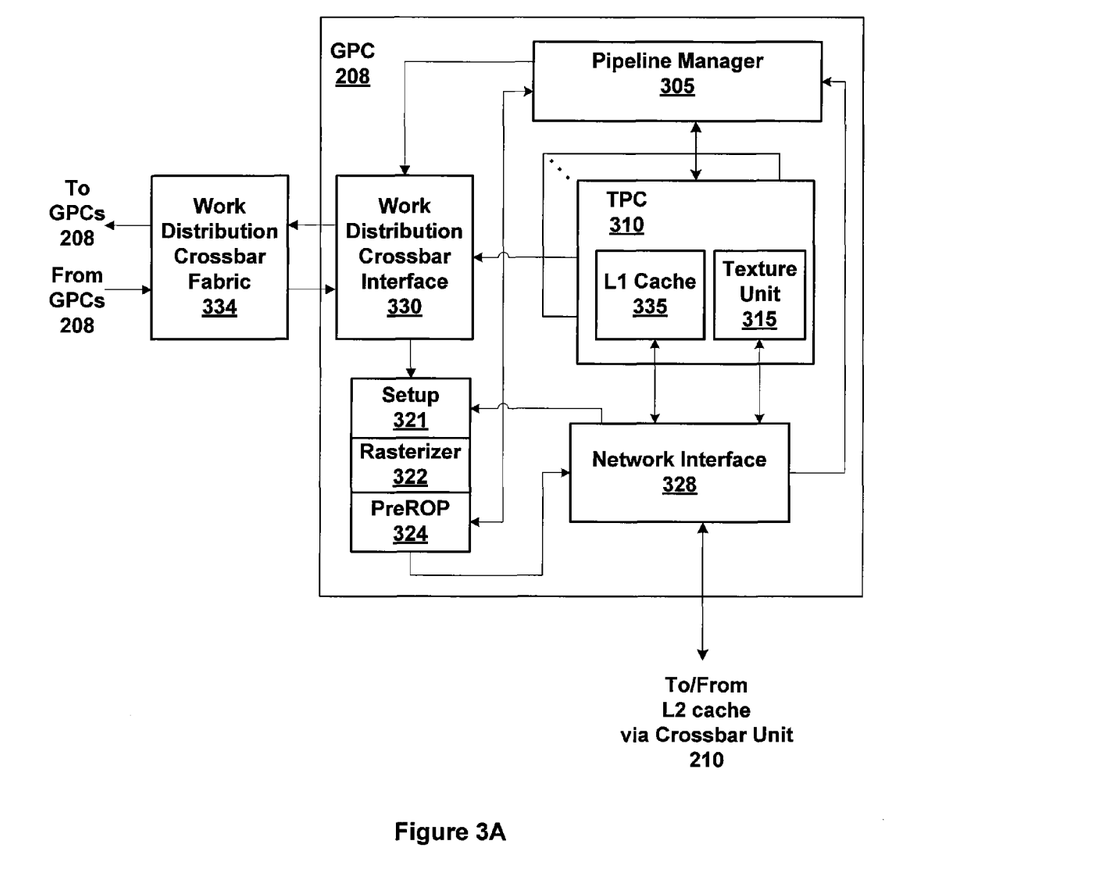
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≥1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory.

Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute render target data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
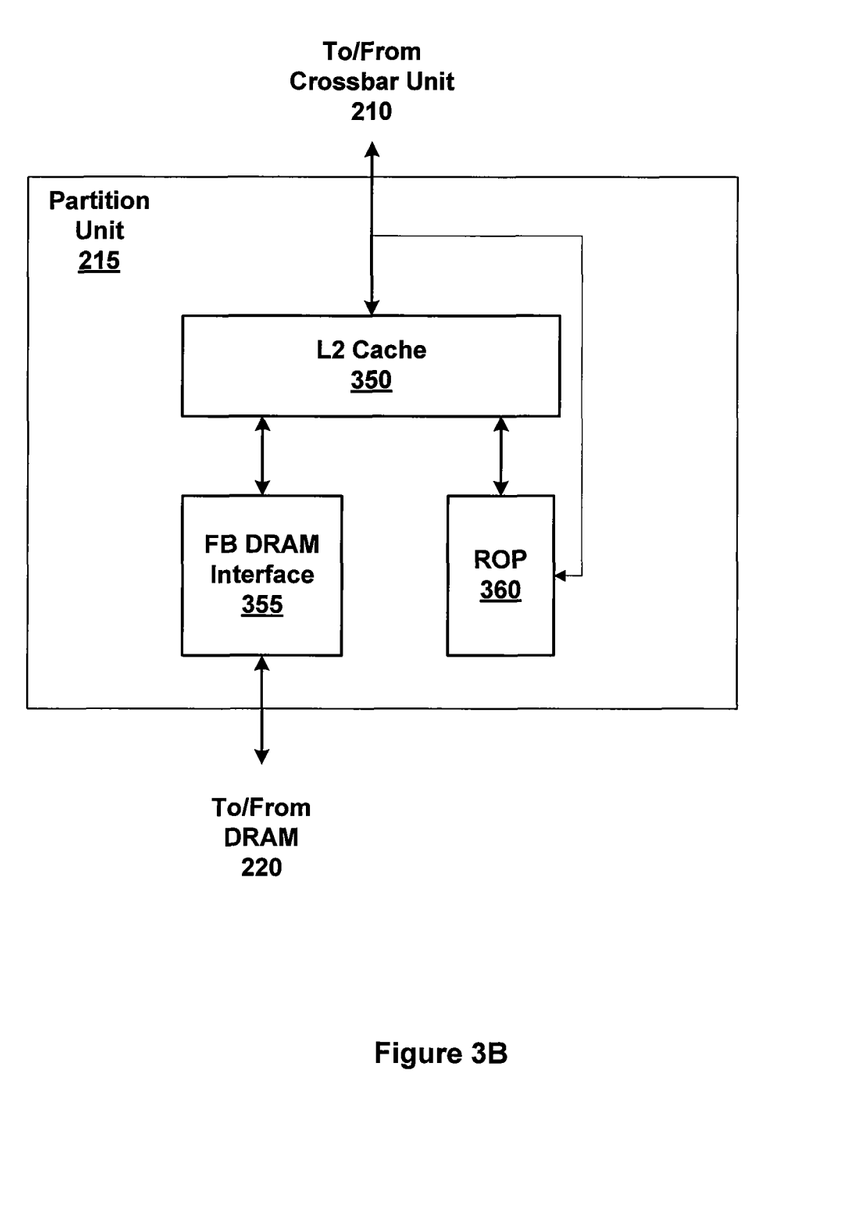
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. Each partition unit 215 includes a ROP 360 in order to distribute processing of the raster operations. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. ROP 360 receives color and z fragment data from the GPCs 208 and may be configured to compress z or color data that is written to memory and decompress z or color data that is read from memory. In some embodiments of the present invention, ROP 360 is included within each GPC 208 instead of partition unit 215, and pixel read and write requests are transmitted over crossbar unit 210 instead of pixel fragment data.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
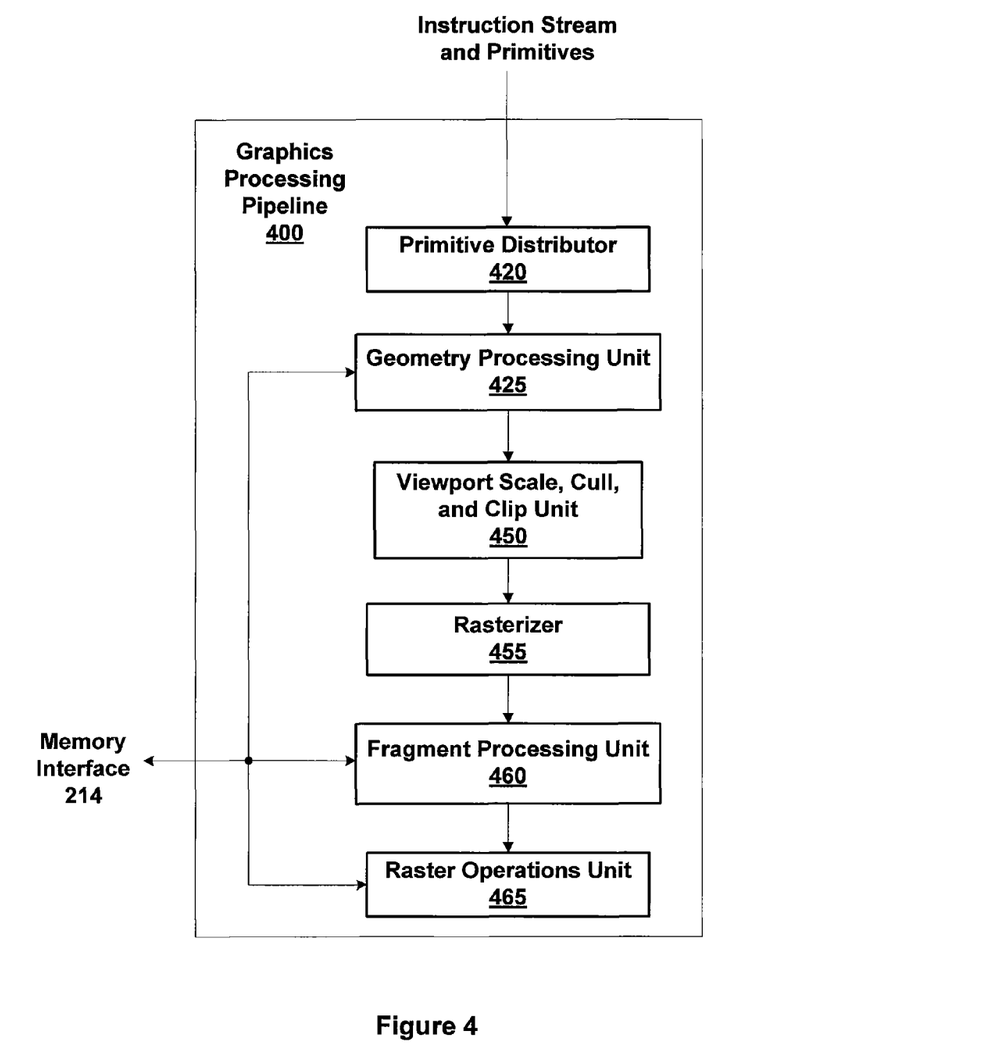
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32 B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Color Compression

Figure 5A:
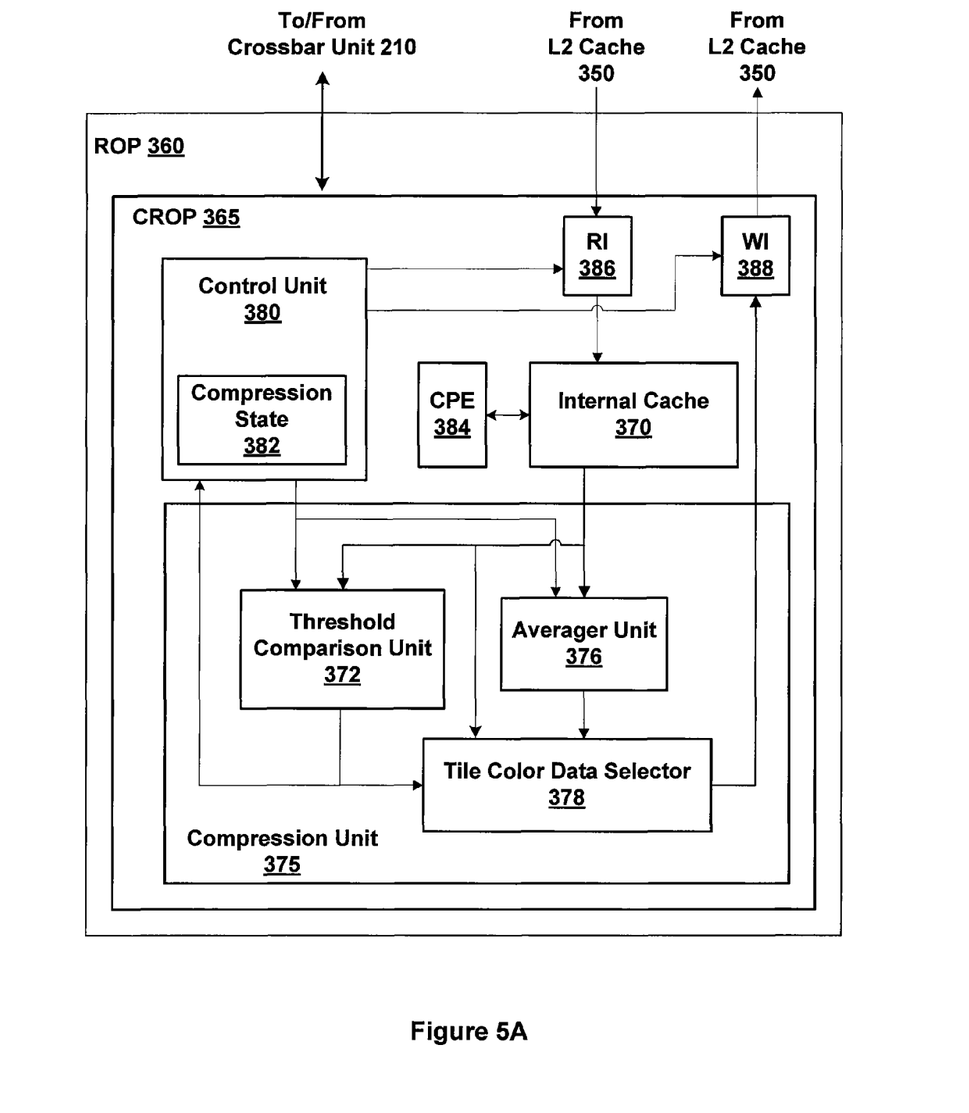
FIG. 5A is a block diagram of a portion of the raster operations unit of FIG. 3B, according to one embodiment of the present invention.

FIG. 5A is a block diagram of a portion of the ROP 360 of FIG. 3B, according to one embodiment of the present invention. The ROP 360 includes a color raster operations unit (CROP) 365, and the CROP 365 includes a control unit 380, internal cache 370, and a compression unit 375. In operation, the CROP 365 performs color raster operations, including compression of color data written to and decompression of color data read from L2 cache 350 via RI 386. The CROP 365 may also include a read interface (RI) 386, a color processing engine (CPE) 384, a write interface (WI) 388, and the like.

When performing color raster operations, the CROP 402 may perform single source blending or dual source blending. The source data is received by CROP 365 from the GPCs 208. In aliased or multi-sample anti-aliased (MSAA) sampling modes, the source data is pixel data since in aliased and MSAA sampling modes, there is only one color value per pixel. In supersampling anti-aliased (SSAA) sampling mode, the source data is per sample.

For single source blending, control unit 380 first determines whether additional data (referred to herein as "destination data") is needed to perform the color raster operation on the source data stored in the internal cache 370. The destination data values may be per pixel or per sample.

If the destination data is not needed, then control unit 380 determines whether the tile is partially or fully covered by the source data. If the tile is partially covered the source data cannot be compressed by the compression unit 375. If the source data does fully cover the tile, then the compression unit can compress the source data. In some embodiments source data may be coalesced in the internal cache 370 so that source data for two or more primitives that each partially cover the tile are aggregated to produce source data that fully covers the tile. When a MSAA sampling mode with many samples is used to produce the source data, the source data is, by definition, reduced since a single color value is used for multiple samples. When a MSAA sampling mode with few samples or a SSAA sampling mode is used to produce the source data, compressing the source data may significantly reduce the size of the source data.

If the destination data is needed and is available in the internal cache 370, then the source data and the destination data is transmitted to CPE 384 to blend the destination data and the source data and produce color data. The color data is then stored in the internal cache 370. Fully covered tiles are output to the compression unit 375 for lossy or lossless reduction compression. The compression unit 375 optionally compresses the color data based on the compression state and transmits the compressed color data to the L2 cache unit 350 via the WI 388 for storage. In some embodiments the compressed color data may be further compressed within the CROP 365 or the L2 cache unit 350 using other techniques.

If the destination data is needed and not available in the internal cache 375, then the control unit 380 first transmits a read request to the L2 cache unit 350 requesting the destination data. The source data is buffered until the destination data is retrieved from the L2 cache unit 350. The L2 cache unit 350 returns the requested destination data to a decompression unit (not shown) that optionally decompresses the requested destination data based on the compression state 382. The color data is then stored in the internal cache 370. The decompressed destination data and the source data are then blended to produce the color data for a tile. Fully covered tiles are output to the compression unit 375 which optionally compresses the color data based on the compression state and transmits the compressed color data to the L2 cache unit 350 for storage.

The compression state 382 is stored in the control unit 380 and includes information specifying the compression format of different render targets stored in graphics memory. The compression state 382 also stores information specifying the color depth, color format, and pixel sample mode for each render target. Examples of some possible color depth values include 8, 16, 24, 32, 64, 128 bits per sample of a pixel, each sample may contain up to four channels. The channels may represent red, green, blue, alpha, luminance, chrominance, saturation, and the like. The different channels may be represented in different formats, such as signed or unsigned integer or floating point values. Finally, different sampling modes specify one or more sub-pixel samples per pixel and positions of the sub-pixel samples within the pixel and well as the number of color values that are shared between two or more samples.

The compression unit 375 is configured to compress color data for a tile in order to reduce the amount of color data that is stored in graphics memory and transmitted between the graphics memory and a PPU 202. The averager unit 376 computes averaged color data as a per-color channel linear average of all the sub-pixel samples in each pixel of the tile. When the sampling mode specifies only one sub-pixel sample per pixel, channels of pixel pairs are averaged to compute per-color channel averages for the pairs of pixels in the tile. In some embodiments the pixel pairs are horizontally adjacent pixels and in other embodiments the pixel pairs are vertically adjacent pixels. In other embodiments, color channels of clusters of four or more samples (or pixels) may be averaged to compute per-color channel combined values for these clusters of samples (or pixels). In yet other embodiments, the color component values may be combined by a means other than simple averaging, for example, non-linear combinations that implement gamma-correct antialiasing or other techniques familiar to one skilled in the art, to compute per-color combined channel values. Consequently, the color data may be compressed for each one of the pixel sample modes.

The threshold comparison unit 372 determines whether sub-pixel samples of each pixel in a tile are similar enough to each other that the averaged color data may be used as the output color data that is compressed. More specifically, the threshold comparison unit 372 performs an equality comparison on a first portion of the color data that includes sign and exponent fields of floating point format values or high order bits of integer format values. The equality comparison may also include some most-significant bits of the mantissa field of floating point format values. A threshold comparison is performed on a second portion of the color data that includes mantissa fields (or least-significant bits of the mantissa field that were not used for the equality comparison) of floating point format values or low order bits of integer format values. The tile color data selector 378 outputs either the original color data received by the compression unit 375 or the averaged color data computed by the averager unit 376 as the output color data, based on the equality comparison result and the threshold comparison result produced by the threshold comparison unit 372.

TABLE 1 illustrates examples of different compression ratios that may be achieved when the averaged color data is output as the output color data.

TABLE 1

| Bits per pixel | Sub-pixel samples per pixel | Compression ratio |
|---|---|---|
| 32 | 1 or 2 | 2:1 |
| 32 | 4 | 4:1 |
| 32 | 8 | 8:1 |
| 64 | 1 or 2 | 2:1 |
| 64 | 4 | 4:1 |
| 64 | 8 | 8:1 |
| 128 | 1 or 2 | 2:1 |
| 128 | 4 | 4:1 |
| 128 | 8 | 8:1 |

The threshold value controls the amount of variation that is tolerated between colors that are compressed. Different threshold values may be specified for each color format and color depth and stored in the compression state 382. Additionally, two or more threshold values may be specified for each render target. For example, an aggressive threshold value and a conservative threshold value may be specified. In some embodiments, the aggressive threshold may allow for the channel values to vary by the largest amount possible given a particular color data format, e.g., for an 8-bit channel the aggressive threshold is 0xff. The conservative threshold may be set to a low value, such that only samples with very similar colors may be reduced. When the conservative threshold is set to zero, only samples with identical colors can be reduced. Reduction in this case is lossless, since the averaged color data exactly equals the input (source) color data Visual artifacts can occur at mesh seams if reduction is allowed between samples of a foreground object and the background as the foreground object is rendered. If the foreground and background have significantly different colors and reduction is performed on pixels straddling a mesh seam, the reduced colors will be a blend of foreground and background. When the primitive from the foreground object on the opposite side of the seam is rendered, portions of the background color will still be visible.

To avoid these artifacts, while maximizing compression, one embodiment uses an "All Covered All Hit Once" heuristic in the threshold comparison unit 372 to choose between the aggressive threshold value and the conservative threshold value. When every sample in the tile is covered by new source fragments AND no sample has been hit by multiple source fragments, the "All Covered All Hit Once" heuristic evaluates to true. This indicates the tile is unlikely to contain a silhouette edge from an unfinished mesh seam and the aggressive threshold value may be used. When the "All Covered All Hit Once" heuristic is false, the tile is likely to contain a silhouette edge from an unfinished mesh seam, thus the conservative threshold value must be used Other embodiments may use different heuristics, may implement additional threshold values or may determine threshold values using a formula. It will be recognized that any such variations are within the scope of this invention.

The threshold comparison unit 372 receives the source color data for the tile and divides the color data into a first portion and a second portion. The first portion includes fields (equality fields) of each channel of each source sub-pixel sample that are compared for exact equality to produce an equality comparison result. The second portion includes fields (threshold fields) that are compared against the threshold value to produce a threshold comparison result. The fields that are used for the equality comparison and the threshold comparison vary based on the color format. For example, the 8 least significant bits (lsbs) of 16 bit floating point data for a channel are included in the threshold field and are input to the threshold comparison. The 8 most significant bits (msbs) are the equality field and are input to the equality comparison. Thus, the sign bit, five exponent bits, and upper two mantissa bits must match exactly. The lower 8 mantissa bits must be within the threshold value. When floating point format values are compared with the threshold value, relative error may be measured since the threshold value implicitly has the same exponent as the first portion of the color data.

TABLE 2 indicates how the data for each color format is mapped to the equality fields and the threshold fields for the equality comparison and the threshold comparison within the threshold comparison unit 372.

TABLE 2

| Color format | DX10 format | Equality fields | Threshold fields |
|---|---|---|---|
| 32 bits per pixel 16 bits per channel 2 sub-pixel samples | R16G16__ FLOAT | Msb of each channel | Lsb of each channel |
| 32 bits per pixel 8 bits per channel 4 sub-pixel samples | R8G8B8A8__ UNORM | None | All |
| 32 bits per pixel 101111 | R11G11B10__ FLOAT | Exponent of each channel | Mantissa of each channel |
| 32 bits per pixel 2101010 | R10G10B10A2__ UNORM | Alpha channel and 2 msbs of R, G, and B | Least significant byte of R, G, and B |
| 64 bits per pixel 16 bits per channel 4 sub-pixel samples | R16G16B16A16__ FLOAT | Most significant byte of each channel | Least significant byte of each channel |
| 128 bits per pixel 32 bits per channel 4 sub-pixel samples | R32G32B32A32__ FLOAT | All | None |

The threshold-based reduction is performed as follows: First, the minimum value and maximum value of each channel is determined for each sample in a pixel of the tile. When sample clusters are used, the minimum value and maximum value of each channel is determined for each sample in a sample cluster of the tile. Then the difference between minimum value and maximum value is computed for each channel of each pixel or each sample cluster in the tile to produce per-channel differences. Finally, the per-channel differences are compared to the threshold value. If all of the per-channel differences are within the threshold value (less than or equal to the threshold value) for all of the pixels or sample clusters in the tile, then the tile can be compressed. When the tile can be compressed, the averaged color data is selected as the output color data for the tile. When one or more of the pixels or sample clusters cannot be compressed, then the original color data for the tile is selected as the output color data for the tile. Note that when a single sample is used for each pixel, each sample cluster may include multiple pixels within the tile.

The averager unit 376, like the threshold comparison unit 372, divides each channel into an equality field and a threshold field. The equality field is assumed to be equal and the threshold field is averaged with the other sample channel values (or sample cluster channel values) to produce combined color data. The field division is identical to that in the threshold comparison unit 372. The threshold field is simply summed across all the samples for a pixel and the sum is divided by the number of samples in the pixel. When sample clusters are used, the threshold field is simply summed across a sample cluster and the sum is divided by the number of samples in the cluster. The combined value for each channel is placed back in line with the equality field creating a whole combined color value for each pixel or sample cluster. The whole combined color values form the combined color data that may be selected by the tile color data selector 378 for output as the output color data.

Although the threshold comparison unit 372 and the averager unit 376 may both be configured to operate on floating point data, no floating point math operations are performed, e.g., subtraction of exponent, normalization of mantissas, and the like. Since the exponents must be identical, the 8 lsbs of the mantissa are treated as integers and the averager unit 376 performs integer-based averaging. Also note that the combined color values for each channel cannot be any greater than the maximum of the different sub-pixel sample values, thus no bits need to be carried from the threshold field to the equality field when combining.

Figure 5B:
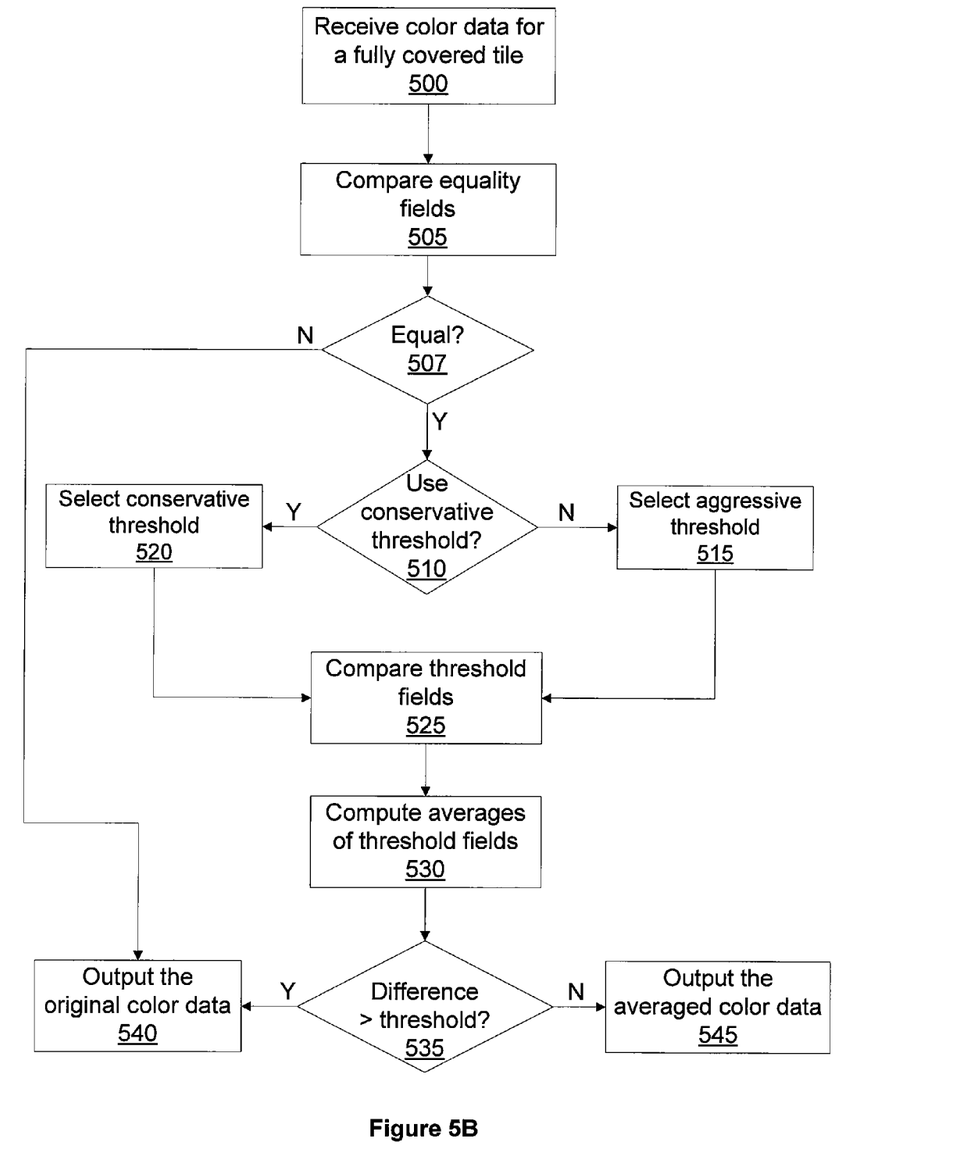
FIG. 5B is a flow diagram of method steps for compressing color data, according to one embodiment of the present invention.

FIG. 5B is a flow diagram of method steps for compressing color data, according to one embodiment of the present invention. At step 500 the compression unit 375 receives the original color data for a fully covered tile. At step 505 the threshold comparison unit 372 compares the equality fields (the first portion of the color data) to produce an equality comparison result. The equality comparison is performed for each pixel or sample cluster to produce the equality comparison result for the tile. At step 507 the threshold comparison unit 372 determines if the equality comparison result indicates that the first portion of the color data includes equal values across each channel of each sample within a pixel or sample cluster, and, if so, then the threshold comparison unit 372 proceeds to step 510. Otherwise, the tile color data selector 378 selects the original color data for output as the output color data.

At step 510 the threshold comparison unit 372 uses a heuristic value, e.g., "All Covered All Hit Once," provided by the control unit 380 to determine if a conservative threshold should be used. If All Covered All Hit Once is true, indicating that a conservative threshold should be used, then at step 520 a conservative threshold value is selected by the threshold comparison unit 372. If All Covered All Hit Once is false, indicating that a conservative threshold should not be used, then at step 515 an aggressive threshold value is selected by the threshold comparison unit 372. At step 525 the threshold comparison unit 372 uses the selected threshold value (aggressive or conservative) to compare the threshold fields (second portion of the color data).

At step 530 the averager unit 376 computes the combined values of the threshold fields (second portion of the color data). At step 535 the threshold comparison unit 372 produces a threshold comparison result that is provided to the tile color data selector 378. A true value for the threshold comparison result indicates that all of the per-channel differences for the samples are less than or equal to the selected threshold value and a false value for the threshold comparison result indicates that all of the per-channel differences for the samples is not less than or equal to (is greater than) the selected threshold value. When the value provided to the tile color data selector 378 is true, at step 545 the computed combined color data is selected for output as the output color data for the tile. When the value provided to the tile color data selector 378 is false, at step 540 the original color data that was received by the compression unit 375 is selected for output as the output color data for the tile. Note that steps 525 and 530 may be performed in parallel, with the result of the threshold test determining whether to output the computed combined color data or the original color data.

Visual artifacts are avoided during the compression of the color data since the combined sub-pixel color components for each pixel (or combined sample cluster components) are selected as the output color data based on the equality comparison and the threshold comparison. The fields included in the first portion of the color data and the second portion of the color data are determined based on the color format. The equality comparison and threshold comparisons allow for compression of color data with small differences, compression of color data with large differences, and compression of color data with no differences (lossless compression). Importantly, a heuristic may be used to ensure that visual artifacts are not introduced when the color data is compressed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for compressing color data, the method comprising:
   receiving the color data for a tile including multiple samples;
   comparing a first portion of the color data for each one of the multiple samples to determine an equality comparison result;
   comparing a second portion of the color data for each one of the multiple samples using a threshold value to compute per-channel differences for each one of the multiple samples and determine a threshold comparison result; and
   compressing, by a processor, the color data for the tile based on the equality comparison result and the threshold comparison result to produce output color data for the tile.

2. The method of claim 1, further comprising the step of computing a per-channel combined value for each pixel in the tile based on per-sample channel values in the second portion of the color data to produce combined color data for each pixel in the tile.

3. The method of claim 2, wherein the step of compressing comprises:
   determining, for all pixels in the tile, that the equality comparison result indicates that the first portion of the color data for each pixel in the tile includes equal values across each channel of each sample within the pixel;
   determining, for all pixels in the tile, that the threshold comparison result indicates that all per-channel differences computed for each pixel in the second portion of the color data are less than or equal to the threshold value; and
   selecting the combined color data for each pixel to produce the output color data for the tile.

4. The method of claim 3, further comprising the step of setting the threshold value to zero to enable lossless compression, wherein, when decompressed, the combined color data exactly equals the input color data.

5. The method of claim 2, wherein the step of compressing comprises:
   determining, for all pixels in the tile, that the equality comparison result indicates that the first portion of the color data for each pixel in the tile includes equal values across each channel of the multiple samples within the pixel;
   determining that the threshold comparison result indicates that at least one of the per-channel differences computed for each pixel in the second portion of the color data is greater than the threshold value; and
   selecting the color data received for the tile to produce the output color data for the tile.

6. The method of claim 1, further comprising the step of computing a per-channel combined value for each sample cluster in the tile based on channel values of each sample cluster in the second portion of the color data to produce combined color data for the tile, wherein a sample cluster includes two or more samples in the tile.

7. The method of claim 6, wherein the step of compressing comprises:
   determining, for all sample clusters in the tile, that the equality comparison result indicates that the first portion of the color data for each sample cluster in the tile includes equal values across each channel of each sample in the sample cluster;
   determining, for all sample clusters in the tile, that the threshold comparison result indicates that all per-channel differences computed for each sample cluster in the second portion of the color data are less than or equal to the threshold value; and
   selecting the combined color data to produce the output color data for the tile.

8. The method of claim 1, further comprising the step of selecting a conservative threshold value as the threshold value when a heuristic indicates the tile may include a silhouette edge.

9. The method of claim 8, wherein the heuristic indicates whether every sample in the tile is covered by new source fragments and no sample in the tile is covered by more than one source fragment.

10. The method of claim 1, further comprising the step of selecting an aggressive threshold value as the threshold value when a heuristic indicates that no silhouette edge intersects the tile.

11. The method of claim 1, wherein the first portion of the color data for each one of the multiple pixels includes exponent fields and sign bits of a floating point representation of the color data.

12. The method of claim 1, wherein the second portion of the color data for each one of the multiple pixels includes only bits of mantissa fields of a floating point representation of the color data.

13. A computer-readable storage medium storing instructions that, when executed by a processor, cause the processor to compress color data, by performing the steps of:
   receiving the color data for a tile including multiple samples;
   comparing a first portion of the color data for each one of the multiple samples to determine an equality comparison result;
   comparing a second portion of the color data for each one of the multiple samples using a threshold value to compute per-channel differences for each one of the multiple samples and determine a threshold comparison result; and
   compressing the color data for the tile based on the equality comparison result and the threshold comparison result to produce output color data for the tile.

14. A system for compressing color data, the system comprising:
   a processor configured to:
      receive the color data for a tile including multiple samples;
      compare a first portion of the color data for each one of the multiple samples to determine an equality comparison result;
      compare a second portion of the color data for each one of the multiple samples using a threshold value to compute per-channel differences for each one of the multiple samples and determine a threshold comparison result; and
      compress the color data for the tile based on the equality comparison result and the threshold comparison result to produce output color data for the tile.

15. The system of claim 14, further comprising a memory storing instructions that, when executed by the processor, configures the processor to:
   receive the color data for the tile;
   compare the first portion of the color data to determine the equality comparison result;
   compare the second portion of the color data to determine the threshold comparison result; and
   compress the color data for the tile.

16. The system of claim 14, wherein the processor is further configured to compute a per-channel combined value for each pixel in the tile based on per-sample channel values in the second portion of the color data to produce combined color data for the tile.

17. The system of claim 16, wherein the processor is further configured to:
   determine, for all pixels in the tile, that the equality comparison result indicates that the first portion of the color data for each pixel in the tile includes equal values across each channel of each sample within the pixel;
   determine, for all pixels in the tile, that the threshold comparison result indicates that all per-channel differences computed for each pixel in the second portion of the color data are less than or equal to the threshold value; and
   select the combined color data to produce the output color data for the tile.

18. The system of claim 17, wherein the threshold value is set to zero to enable lossless compression and, when decompressed, the combined color data exactly equals the input color data.

19. The system of claim 16, wherein the processor is further configured to:
   determine, for all pixels in the tile, that the equality comparison result indicates that the first portion of the color data for each pixel in the tile includes equal values across each channel of each sample within the pixel;
   determine that the threshold comparison result indicates that at least one per-channel differences computed for each pixel in the second portion of the color data is greater than the threshold value; and
   select the color data received for the tile to produce the output color data for the tile.

20. The system of claim 14, wherein the processor is further configured to select a conservative threshold value as the threshold value when a heuristic value indicates the tile may include a silhouette edge.

21. The system of claim 14, wherein the processor is further configured to select an aggressive threshold value as the threshold value when a heuristic indicates that every sample in the tile is covered by new source fragments and no sample in the tile is covered by more than one source fragment.

* * * * *